United States Patent
Ando

(10) Patent No.: US 12,286,087 B2
(45) Date of Patent: Apr. 29, 2025

(54) AUTOMATIC BRAKE CONTROL APPARATUS FOR VEHICLE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 263 days.

(21) Appl. No.: 17/710,165

(22) Filed: Mar. 31, 2022

(65) Prior Publication Data

US 2022/0379856 A1 Dec. 1, 2022

(30) Foreign Application Priority Data

May 26, 2021 (JP) ................................ 2021-088412

(51) Int. Cl.
*B60T 8/1755* (2006.01)
*B60T 8/171* (2006.01)
*B60T 13/74* (2006.01)

(52) U.S. Cl.
CPC ............ *B60T 8/1755* (2013.01); *B60T 8/171* (2013.01); *B60T 13/745* (2013.01); *B60T 2270/306* (2013.01); *B60T 2270/88* (2013.01)

(58) Field of Classification Search
CPC ...... B60T 8/1755; B60T 8/171; B60T 13/745; B60T 2270/306; B60T 2270/88
USPC .......................................................... 701/70
See application file for complete search history.

(56) References Cited

FOREIGN PATENT DOCUMENTS

| JP | 2015-182753 A | 10/2015 | |
|---|---|---|---|
| JP | 2016-124509 A | 7/2016 | |
| WO | WO-2021106924 A1 * | 6/2021 | ............ B60T 13/147 |

OTHER PUBLICATIONS

Office Action dated Dec. 24, 2024, from corresponding Japanese Patent Application No. 2021-088412, 5 pages.

* cited by examiner

*Primary Examiner* — Lindsay M Low
*Assistant Examiner* — Omar Morales
(74) *Attorney, Agent, or Firm* — Rimon P.C.

(57) ABSTRACT

An automatic brake control apparatus for a vehicle is configured to control a brake device of the vehicle in a control of a driving assist system of the vehicle. The automatic brake control apparatus includes electronic control units. The electronic control units include a first electronic control unit and are communicably coupled to each other and configured to exchange data with each other. The first electronic control unit is configured to control the driving assist system. The first electronic control unit is configured to send, to one or more of the electronic control units, an instruction that controls the brake device and that includes a first instruction for controlling a behavior of the vehicle and a second instruction that has an instruction content different from an instruction content of the first instruction.

5 Claims, 4 Drawing Sheets

INTENTION DATA TABLE

| DATA CODE | CONTENT OF INTENTION DATA |
|---|---|
| 0000 | NO PARTICULAR INSTRUCTION IS ISSUED |
| 0001 | CLOSING OF BRAKE CALIPER CLEARANCE: WEAK |
| 0002 | CLOSING OF BRAKE CALIPER CLEARANCE: STRONG |
| 0003 | REPLENISHMENT OF FLUID PRESSURE FOR ELECTRONIC PARKING BRAKE ACTIVATION |
| 0004 | RETAINMENT OF STOP OF VEHICLE AT SLOPED ROAD |
| ⋮ | ⋮ |

FIG. 4

AUTOMATIC BRAKE CONTROL APPARATUS FOR VEHICLE

CROSS-REFERENCE TO RELATED APPLICATIONS

The present application claims priority from Japanese Patent Application No. 2021-088412 filed on May 26, 2021, the entire contents of which are hereby incorporated by reference.

BACKGROUND

The technology relates to an automatic brake control apparatus for a vehicle. A driving assist system referred to as advanced driver-assistance systems (ADAS) is a control system that assists driving to be performed by a driver by automatically controlling a vehicle in place of the driver. The vehicle is provided with a system that achieves various functions including, for example, adaptive cruise control (ACC) system, forward collision warning (FCW), advanced emergency braking system (AEBS), night vision/pedestrian detection (NV/PD), traffic sign recognition (TRS), lane keeping assist system (LKAS), blind spot monitoring (BSM), and advanced parking assist (APA).

A control most often used among the controls of the ADAS is a brake control. A brake control apparatus that includes an electronic control unit (ECU) controls a brake device in the brake control of the ADAS, on the basis of pieces of data obtained from external sensors mounted on the vehicle, including, for example, various sensors and cameras. For example, reference is made to Japanese Unexamined Patent Application Publication No. 2015-182753.

SUMMARY

An aspect of the technology provides an automatic brake control apparatus for a vehicle. The automatic brake control apparatus is configured to control a brake device of the vehicle in a control of a driving assist system of the vehicle. The automatic brake control apparatus includes electronic control units. The electronic control units include a first electronic control unit and are communicably coupled to each other and configured to exchange data with each other. The first electronic control unit is configured to control the driving assist system. The first electronic control unit is configured to send, to one or more of the electronic control units, an instruction that controls the brake device and that includes a first instruction for controlling a behavior of the vehicle and a second instruction that has an instruction content different from an instruction content of the first instruction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 4 is an explanatory diagram illustrating an example of an intention data table.

DETAILED DESCRIPTION

Figure 1:
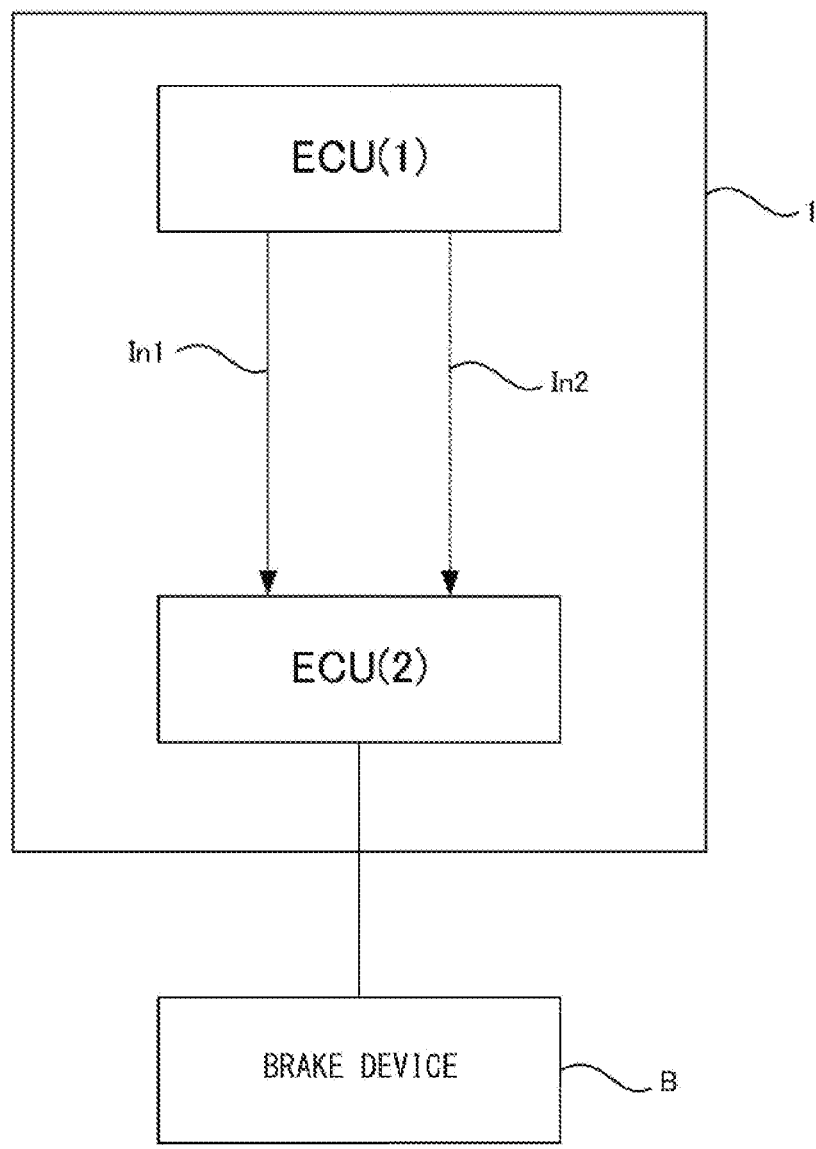
FIG. 1 is an explanatory diagram illustrating an automatic brake control apparatus for a vehicle according to one example embodiment of the technology.

A brake control among controls of ADAS aims to decrease a speed of a vehicle. An ECU receives a detection signal of each wheel speed sensor, and so controls a brake device, or a fluid pressure, as to cause the speed of the vehicle to be decreased in response to a situation, on the basis of a deceleration rate instruction issued by the ADAS.

However, the brake device can involve an amount of operation and a fluid pressure fluctuation that do not influence the vehicle speed. Accordingly, the following example concern can arise if the brake control among the controls of the ADAS is performed solely on the basis of the deceleration rate instruction. Namely, it is not possible to perform a delicate control that takes into consideration the amount of operation and the fluid pressure fluctuation that do not influence the vehicle speed.

For example, a clearance provided between a pad and a rotor of a brake caliper is essential for preventing a brake friction from being generated upon traveling of the vehicle. However, in a case of bringing the vehicle to an emergency stop, an operation of closing the clearance can delay the generation of the brake friction. In this case, the presence of the clearance can become a factor for decreasing the readiness of the brake. It is possible to solve the decrease in the readiness mentioned above if the operation of closing the clearance of the brake caliper is performable in advance under various situations of the controls of the ADAS. Unfortunately, it is difficult for an existing brake control apparatus, where the brake device is controlled in response to the detection signals of the wheel speed sensors on the basis of the deceleration rate instruction issued by the ADAS, to perform such a delicate control that closes in advance the clearance of the caliper prior to the issuance of the deceleration rate instruction.

In addition, in general, the brake control among the controls of the ADAS involves sending the deceleration rate instruction issued by the ADAS to an electronic stability program (ESP), or a vehicle dynamics control (VDC), that controls a behavior of the vehicle, and causing the ESP to calculate a signal that controls the brake device. Accordingly, in a case where the brake device is to be controlled via the ESP as mentioned above, fail-safe measures are important for any case where it is difficult to control a behavior of the vehicle due to a temporal malfunction of an operation of the EPS device, or due to a malfunction of a device such as the wheel speed sensor.

It is desirable to provide an automatic brake control apparatus for a vehicle which makes it possible to increase readiness of a brake control among controls of a driving assist system such as ADAS and thus allow for a delicate brake control thereof, and makes it possible to construct a system that secures a redundancy that allows for an appropriate brake control even in a situation where it is difficult to control a vehicle behavior.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

An automatic brake control apparatus for a vehicle (hereinafter referred to as an "automatic brake control apparatus") 1 includes a plurality of electronic control units (hereinafter referred to as "ECUs"). The plurality of ECUs is communicably coupled to each other and configured to exchange data with each other through an in-vehicle network such as controller area network (CAN).

According to a first example embodiment illustrated in FIG. 1, the automatic brake control apparatus 1 may control a brake device B. The automatic brake control apparatus 1 may include: an ECU(1) as a first ECU; and an ECU(2) as another ECU to which the ECU(1) sends instructions on a brake control. In one embodiment, the ECU(1) may serve as a "first electronic control unit". In some embodiments, the ECU(1) and the ECU(2) each may be a single ECU. In some embodiments, one or both of the ECU(1) and the ECU(2) may be configured by a plurality of ECUs that works in cooperation with each other.

The ECU(1) may be an ECU that executes a control of ADAS. The ECU(1) may send, in response to various situations of the ADAS control, instructions on the brake control to the ECU(2). Upon sending the instructions, the ECU(1) may send a first instruction In1 and a second instruction In2 to the ECU(2). The first instruction In1 is directed to a control of a behavior of the vehicle in response to a control of the ADAS. In some embodiments, the first instruction In1 may be a deceleration rate instruction. The second instruction In2 has an instruction content that is different from an instruction content of the first instruction In1. In some embodiments, the second instruction In2 may be an instruction on a change in fluid pressure for a hydraulic pressure circuit control of the brake device B.

The ECU(1) that performs the ADAS control may issue instructions on the brake control by means of two instruction systems including the first instruction In1 and the second instruction In2 as described above. Thus, it helps to execute the control of the vehicle behavior on the basis of the first instruction In1, and to appropriately perform an operation of the brake device that does not appear in the vehicle behavior on the basis of the second instruction In2. Non-limiting examples of the operation of the brake device that does not appear in the vehicle behavior may include an operation of closing a clearance of a brake caliper in advance and an operation of compensating for a decrease in fluid pressure after activation of an electronic parking brake (EPB). Accordingly, it helps to allow the automatic brake control apparatus 1 to perform the brake control of the ADAS control with high readiness, and allow the automatic brake control apparatus 1 to perform a delicate control that is difficult to be achieved only by the deceleration rate instruction.

According to the first example embodiment illustrated in FIG. 1, the ECU(2) may be an ECU that controls a behavior of the vehicle. In one embodiment, the ECU(2) may serve as a "second electronic control unit". In some embodiments, the ECU(2) may include an ESP. In such embodiments, the first instruction In1 may be the deceleration rate instruction that controls the vehicle behavior, and the ESP may perform, in response to the first instruction In1, a vehicle behavior control that fulfills a request made by the ADAS. Further, in some embodiments where the ECU(2) includes the ESP, the second instruction In2 may include: a fluid pressure instruction for the brake device B; and an intention data as to why the fluid pressure instruction is sent.

The second instruction In2 may contain the intention data as described above. This configuration helps to allow the ESP to recognize an intention of why the fluid pressure instruction is issued by the ADAS when the ESP outputs, in response to the first instruction In1, a control signal that controls the brake device B. Accordingly, it helps to allow the ESP to appropriately output the control signal by taking into consideration the fluid pressure instruction given from the ADAS.

Figure 2:
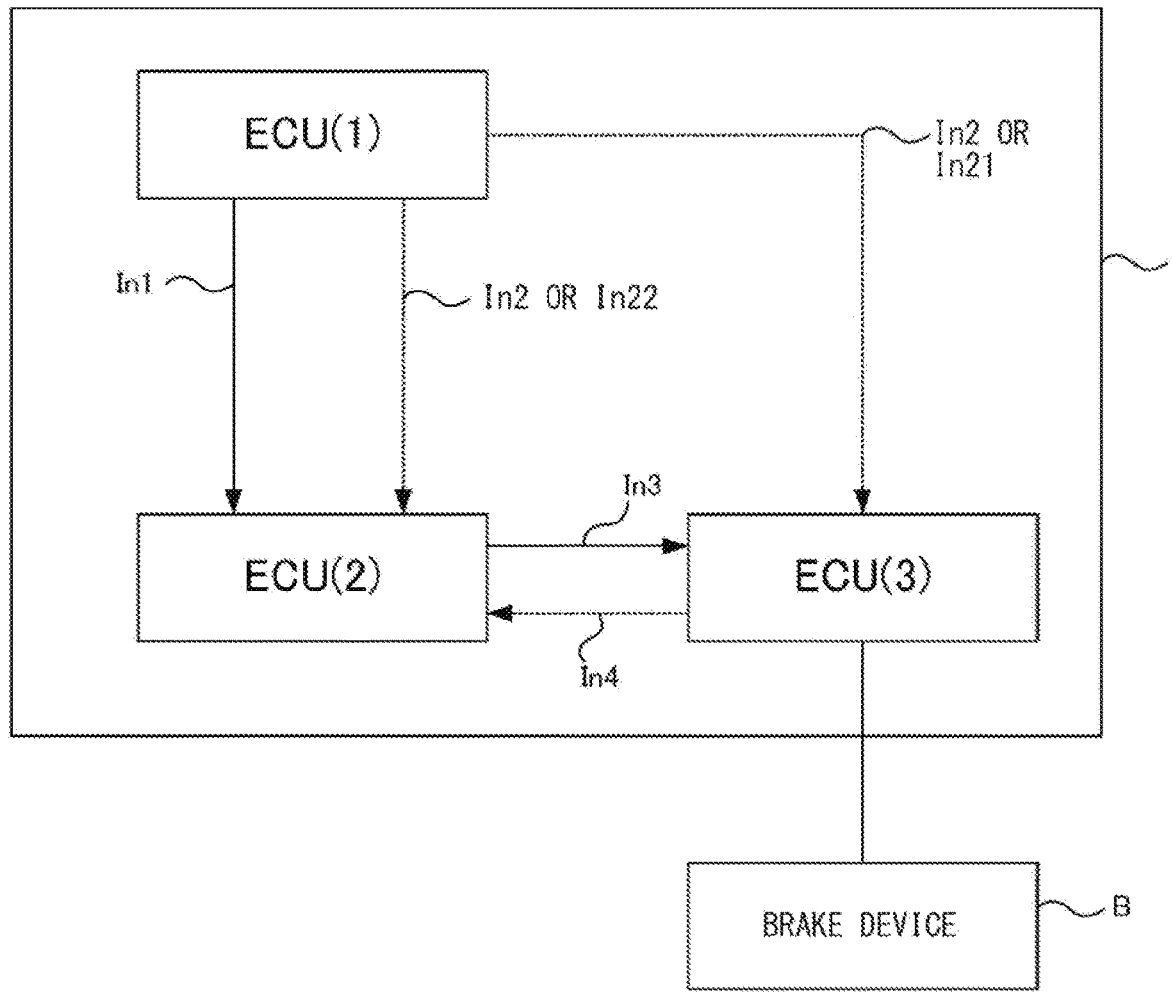
FIG. 2 is an explanatory diagram illustrating an automatic brake control apparatus for a vehicle according to one example embodiment of the technology.

According to a second example embodiment illustrated in FIG. 2, the automatic brake control apparatus 1 may include the plurality of ECUs including an ECU(3) in addition to the ECU(1) and the ECU(2). In one embodiment, the ECU(3) may serve as a "third electronic control unit". In the second example embodiment, the instruction on the brake control given from the ECU(1) that performs the control of the ADAS may be sent to the ECU(3) via the ECU(2), and the ECU(3) may output the control signal to the brake device B. In some embodiments, the ECU(2) may be the ECU that controls the behavior of the vehicle as described above, such as the ESP. In some embodiments, the ECU(3) may be an ECU that sends the control signal to a motor booster of the brake device B. A system configuration according to the second example embodiment illustrated in FIG. 2 is compliant to the VDA (German association of automobile industry) standards.

The ECU(1) may send, to other ECUs, the instructions on the brake control including: the first instruction In1; and the second instruction In2 including an instruction In21 and an instruction In22. The first instruction In1 is directed to a control of the behavior of the vehicle, and may be sent to the ECU(2) such as the ESP. In some embodiments, the first instruction In1 may be the deceleration rate instruction. The instruction In21 may be sent to the ECU(3). In some embodiments, the instruction In21 may be the instruction on the fluid pressure for the hydraulic pressure circuit control of the brake device B. The instruction In22 may be sent to the ECU(2). In some embodiments, the instruction In22 may be the intention data as to why the ECU(1) has sent the fluid pressure instruction to the ECU(3).

In the system configuration according to the second example embodiment illustrated in FIG. 2, the ECU(1) may send the first instruction In1, such as the deceleration rate instruction, to the ECU(2). Upon receiving the first instruction In1, the ECU(2) may issue an instruction In3 for the ECU(3), on the basis of the first instruction In1. In some embodiments, the instruction In3 may relate to a flow rate that varies the fluid pressure of the brake device B. The ECU(3) may output a control signal, or a motor booster control signal, that controls the brake device B in response to the instruction In3.

The ECU(1) may send, to the ECU(3), the instruction In21 directed to the fluid pressure instruction on an as-necessary basis. Upon sending the instruction In21, the ECU(1) may send, to the ECU(2) and as the instruction In22, the intention data as to why the instruction In21 directed to the fluid pressure instruction is sent. Sending the instruction In22 helps to allow the ECU(2) to recognize the fact and its intention that the ECU(1) has directly given the fluid pressure instruction to the ECU(3), and to allow the ECU(2) to issue the instruction In3 by taking into consideration the intention data.

In a case where the instruction In21 directed to the fluid pressure instruction is sent from the ECU(1) directly to the ECU(3), the ECU(3) may send, to the ECU(2), data In4 on a state of achievement of the fluid pressure instruction that is based on the instruction In21. The data In4 may be data necessary for arbitration between the fluid pressure instruction that is based on the instruction In21 and the instruction In3. In some embodiments, the ECU(3) may send, to the ECU(2) and as the data In4, factors including, for example: current data as to a current level of a fluid pressure that is based on the execution of the instruction In21; and a predicted value as to how many milliseconds are going to be necessary for the fluid pressure to reach the fluid pressure indicated by the instruction In21.

Sending the data In4 helps to allow the ECU(2) to issue the instruction In3 by taking into consideration the intention data that is based on the instruction In22 and the data In4. In order to prevent the fluid pressure instruction that is based on the instruction In21, directly issued to the ECU(3) by the ECU(1), from interfering with the instruction In3 to be issued by the ECU(2) on the basis of the deceleration rate instruction that is based on the first instruction In1, the fluid pressure instruction that is based on the instruction In21 may be an instruction that does not influence a change in behavior of the vehicle, or may be an instruction that less influences the change in the behavior of the vehicle. For example, it helps to reduce or eliminate the interference described above by limiting the fluid pressure instruction that is based on the instruction In21 to an operation of the brake device that does not appear in the vehicle behavior. Non-limiting examples of the operation of the brake device that does not appear in the vehicle behavior may include the operation of closing the clearance of the brake caliper in advance and the operation of compensating for the decrease in the fluid pressure after the activation of the EPB.

However, in a case where the fluid pressure instruction that is based on the instruction In21 is sent with the intention that indicates a high level of emergency, the fluid pressure instruction that is based on the instruction In21 may be prioritized. In this case, the control of the brake device B may be so executed that the fluid pressure that is based on the instruction In21 is prioritized over the control of the vehicle behavior and is achieved immediately.

Figure 3:
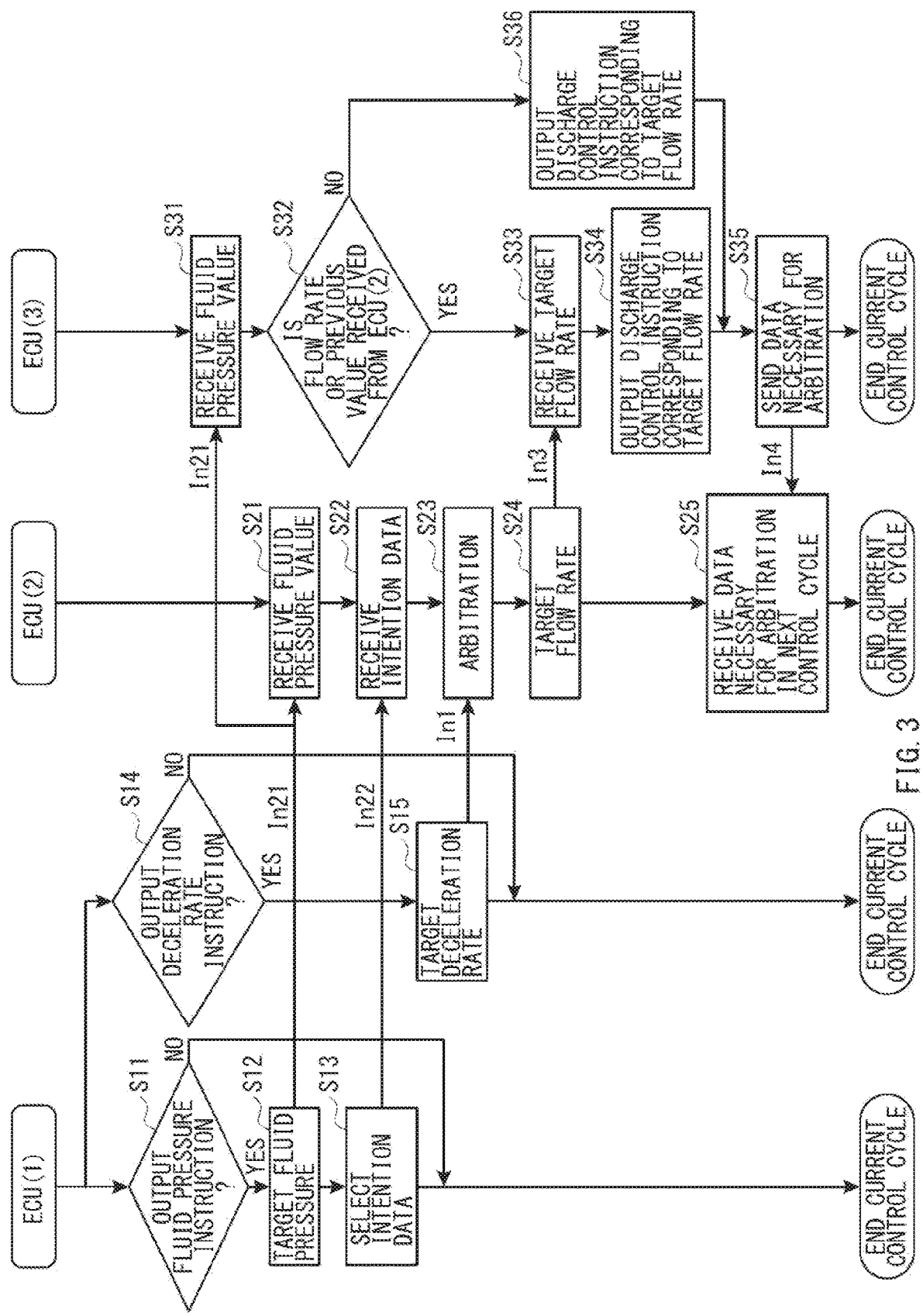
FIG. 3 is a sequence diagram illustrating processes of respective ECUs according to one example embodiment.

FIG. 3 is a sequence diagram illustrating an example of processes in one control cycle of the respective ECUs according to the second example embodiment illustrated in FIG. 2. In step S11, the ECU(1) that performs the controls of the ADAS may determine whether to output the fluid pressure instruction that is based on the instruction In21, on the basis of a situation of the ADAS control and outputs of various sensors. If the ECU(1) determines in step S11 to output the fluid pressure instruction (step S11: YES), the process may proceed to step S12. In step S12, the ECU(1) may calculate a target fluid pressure to be instructed in response to a situation, and may send, to the ECU(2) and the ECU(3), the calculated fluid pressure value thereof as the instruction In21. Thereafter, in step S13, upon sending the instruction In21, the ECU(1) may select, from an intention data table illustrated by way of example in FIG. 4, the intention data as to why the fluid pressure value is sent, and may send, to the ECU(2), the intention data as the instruction In22. If the ECU(1) determines not to output the fluid pressure instruction in step S11 (step S11: NO), steps S12 and S13 may be skipped and the current control cycle may end.

In step S14, the ECU(1) may determine, along with step S11, whether to output the deceleration rate instruction that is based on the first instruction In1, on the basis of a situation of the ADAS control and outputs of various sensors. If the ECU(1) determines in step S14 to output the deceleration rate instruction (step S14: YES), the process may proceed to step S15. In step S15, the ECU(1) may calculate a target deceleration rate to be instructed in response to a situation, and may send, to the ECU(2), the calculated deceleration rate as the first instruction In1. If the ECU(1) determines not to output the deceleration rate instruction in step S14 (step S14: NO), step S15 may be skipped and the current control cycle may end.

Referring to FIG. 4, the intention data table mentioned above may contain data codes corresponding to respective contents of the intention data. In some embodiments, the intention data table may be held in a memory provided in the ECU(1). In step S13, the ECU(1) may select, from the data codes, a condition that serves as a basis of the target fluid pressure sent in step S12 by referring to a content of the intention data in the intention data table, and may send, to the ECU(2), the selected data code as the instruction In22. For example, in a case where the target fluid pressure value of 0.2 MPa is sent in step S12, the ECU(1) may send, to the ECU(2), the data code of "0002" as the data code corresponding thereto in step S13.

Referring back to FIG. 3, a description is given further of processes of the ECU(2) and the ECU(3) in a case where the first instruction In1 and the second instruction, i.e., the instructions In21 and In22, are sent from the ECU(1).

In step S21, the ECU(2) may receive the target fluid pressure value that is based on the instruction In21. Thereafter, in step S22, the ECU(2) may receive the intention data that is based on the instruction In21. By receiving the target fluid pressure value that is based on the instruction In21 and the intention data that is based on the instruction In21, the ECU(2) may recognize that the fluid pressure instruction that is based on the instruction In21 is directly issued to the ECU(3). Accordingly, in a case where the deceleration rate instruction is issued on the basis of the first instruction In1, the ECU(2) may perform an arbitration process in step S23 without immediately calculating a target flow rate in step S24. On the basis of a result of the arbitration performed in step S23, the ECU(2) may calculate the target flow rate in step S24, and may send, to the ECU(3), a result of the calculation of the target flow rate as the instruction In3.

The ECU(3) may receive the target fluid pressure value that is based on the instruction In21 in step S31. Thereafter, in step S32, the ECU(3) may determine whether a target flow rate, or a previous value, is received from the ECU(2) in a previous control cycle. If the ECU(3) determines in step S32 that the target flow rate, or the previous value, is not received from the ECU(2) in the previous control cycle (step S32: NO), the process may proceed to step S36. In this case, the fluid pressure value received in step S31 may serve as an initial reception value that is based on the instruction In21 issued by the ECU(1). In step S36, the ECU(3) may determine a target flow rate on the basis of the initial reception value without waiting for the reception of the target flow rate from the ECU(2), and may output, to a hydraulic pressure circuit in the brake device B, a discharge control instruction corresponding to the thus-determined target flow rate.

If the ECU(3) determines in step S32 that the target flow rate, or the previous value, is received from the ECU(2) in the previous control cycle (step S32: YES), the process may proceed to step S33. In step S33, the ECU(3) may wait for the reception of the target flow rate to be sent from the ECU(2) in the current control cycle. Thereafter, in step S34, the ECU(3) may output, to the hydraulic pressure circuit in the brake device B, a discharge control instruction corresponding to the target flow rate received in the current control cycle.

In step S35, after issuing the discharge control instruction to the brake device B in step S34 or S36, the ECU(3) may send, to the ECU(2), pieces of data as the data In4 necessary for the arbitration described above. Non-limiting examples of the data as the data In4 may include: a current fluid pressure value (e.g., 0.1 MPa) achieved by the target fluid pressure (e.g., 0.2 MPa) that is based on the instruction In21; and an expected fluid pressure (e.g., 0.15 MPa) to be reached in the next control cycle. Thereafter, the ECU(3) may end the current control cycle. In step S25, the ECU(2) may receive the data In4 as data necessary for arbitration in the next control cycle.

In step S23, the ECU(2) may perform the arbitration on the basis of: the target deceleration rate sent as the first instruction In1 from the ECU(1); the data In4 corresponding to the previous control cycle sent from the ECU(3) in step S35 in the previous control cycle; the target fluid pressure value sent on the basis of the instruction In21 in the current control cycle; and the intention data sent on the basis of the instruction In22 in the current control cycle. Thereafter, in step S24, the ECU(2) may calculate the target flow rate on the basis of a result of the arbitration, and may send, to the ECU(3), a result of the thus-calculated target flow rate as a target flow rate value, i.e., the instruction In3. After sending the target flow rate in step S24, the ECU(2) may receive, in step S25, the data necessary for the arbitration to be used in the next control cycle, and may end the current control cycle.

The automatic brake control apparatus 1 according to an example embodiment described above helps to perform the brake control of the ADAS control on the basis of both the deceleration rate control that is suitable for controlling the vehicle behavior and the fluid pressure control that directly controls the hydraulic pressure circuit of the brake device. Thus, it helps to increase the readiness of the brake control and to increase an actual accuracy of the vehicle behavior by means of the delicate control, by making appropriate the division of roles between the deceleration rate control and the fluid pressure control. In addition, providing two instruction systems for the brake control helps to construct the system configuration that secures the redundancy.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. Further, techniques according to the example embodiments and their modification examples described above may be combined in any combination unless any particular contradiction or issue occurs in terms of a purpose, a configuration, etc., thereof.

An automatic brake control apparatus for a vehicle according to at least one embodiment of the technology includes the first electronic control unit configured to control the driving assist system and send the instruction, to another electronic control unit, that controls the brake system, on the basis of the two instruction systems including the first instruction and the second instruction that has the instruction content different from the instruction content of the first instruction. Thus, it helps to issue the instruction that controls the behavior of the vehicle, such as the deceleration rate instruction, by means of the first instruction and to send the instruction that directly operates the brake device, such as the fluid pressure instruction, by means of the second instruction.

Accordingly, it helps to increase the readiness of the brake control among controls of the driving assist system such as ADAS and thus allow for the delicate brake control thereof. It also helps to construct a system that secures the redundancy that allows for the appropriate brake control even in a situation where it is difficult to control the vehicle behavior.

The invention claimed is:

1. An automatic brake control apparatus for a vehicle, the automatic brake control apparatus being configured to control a brake device of the vehicle in a control of a driving assist system of the vehicle, the automatic brake control apparatus comprising:
   a first electronic control unit (ECU) configured to control the driving assist system;
   a second ECU configured to control a behavior of the vehicle; and
   a third ECU configured to control the brake device, wherein:
   the first ECU, the second ECU and the third ECU are communicably coupled to each other and configured to exchange data with each other,
   the first ECU is configured to send a first instruction that is an instruction on a deceleration rate of the vehicle to the second ECU,
   the first ECU is configured to send a second instruction including a fluid pressure instruction on a change in fluid pressure of the brake device to the third ECU, and send intention data related to an intention of sending the second instruction to the second ECU,
   the second ECU is configured to issue an instruction for the third ECU on a basis of the first instruction, and
   in a case where the fluid pressure instruction of the second instruction is sent to the third ECU, the third ECU is configured to send, to the second ECU, data related to a state of achievement of the fluid pressure instruction.

2. The automatic brake control apparatus for the vehicle according to claim 1, wherein the second instruction comprises an instruction that has no influence on a change in the behavior of the vehicle due to the first instruction.

3. The automatic brake control apparatus for the vehicle according to claim 2, wherein:
   the second ECU comprises an electronic control unit for an electronic stability program, and
   the third ECU comprises an electronic control unit configured to send a control signal to a motor booster of the brake device.

4. The automatic brake control apparatus for the vehicle according to claim 1, wherein:
   the second ECU comprises an electronic control unit for an electronic stability program, and
   the third ECU comprises an electronic control unit configured to send a control signal to a motor booster of the brake device.

5. The automatic brake control apparatus for the vehicle according to claim 1, wherein the intention data is selected from a data table stored in the first ECU.

* * * * *